INVENTOR.
Elvin C. Welch
BY
Paul J. Ethington
ATTORNEY

April 4, 1967  E. C. WELCH  3,312,423
INERTIAL GUIDANCE SYSTEM WITH STELLAR CORRECTION
Filed Sept. 10, 1962  4 Sheets-Sheet 3

INVENTOR.
Elvin C. Welch
BY
Paul J. Ethington
ATTORNEY

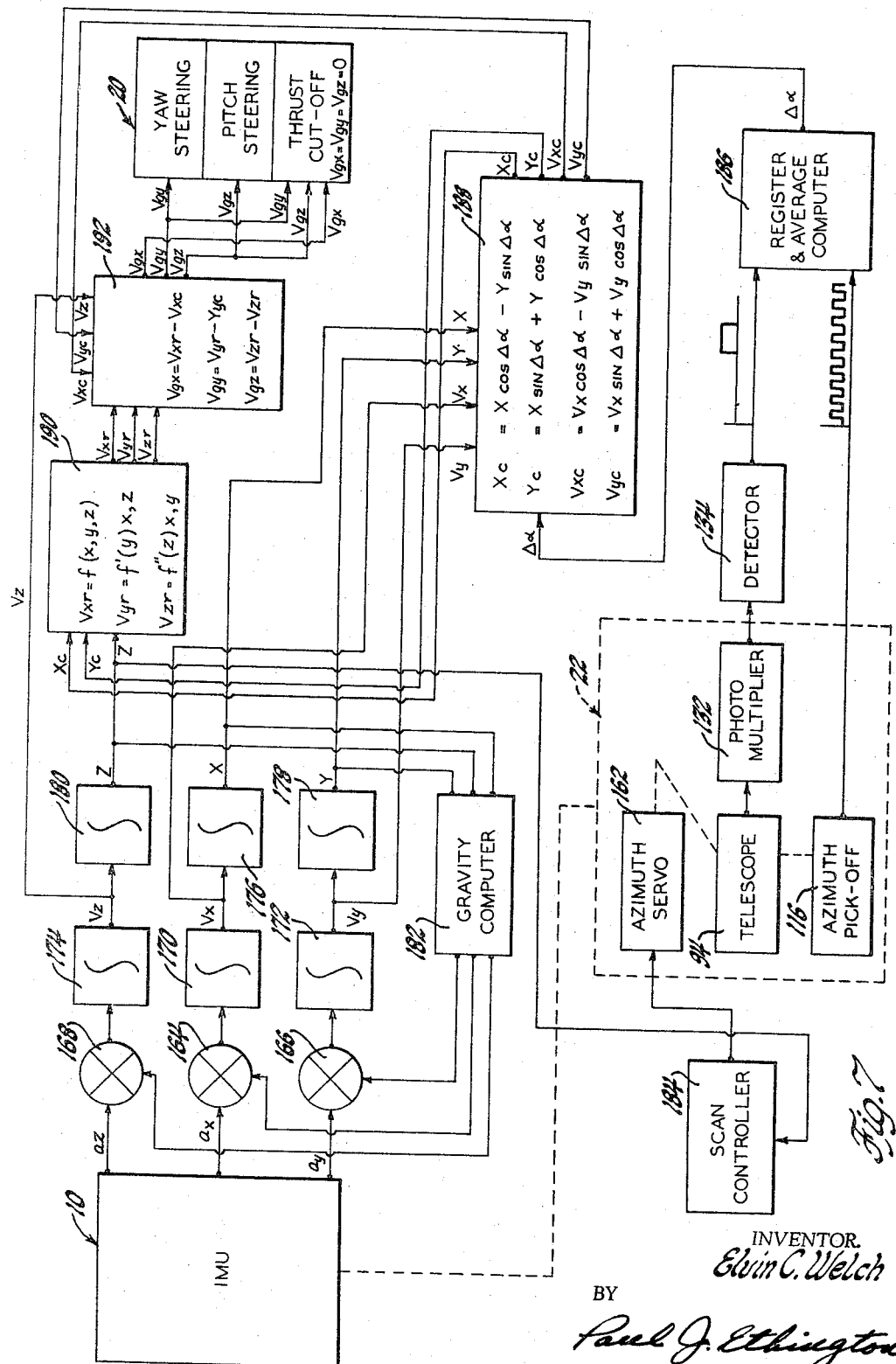

United States Patent Office 3,312,423
Patented Apr. 4, 1967

3,312,423
INERTIAL GUIDANCE SYSTEM WITH
STELLAR CORRECTION
Elvin C. Welch, Culver City, Calif., assignor to General
Motors Corporation, Detroit, Mich., a corporation of
Delaware
Filed Sept. 10, 1962, Ser. No. 222,509
2 Claims. (Cl. 244—3.18)

This invention relates to inertial guidance systems for space vehicles, such as ballistic missiles, and more particularly to an improved system for achieving precise azimuth alignment of the guidance system.

The requirement for mobility in missile launching imposes a problem of establishing initial conditions including the geographic position of the launch site and the orientation of the inertial measurement unit. In mobile systems, as in missile launching from fixed sites, initial conditions must be established with a high degree of accuracy and within a very short reaction time between "prepare to launch" and "launch ready" conditions. In accordance with this invention, a guidance system is provided which permits a missile to be launched from previously unspecified and unsurveyed sites. The missile may be transported on a carrier vehicle and the choice of launch sites is limited only by the roadways over which the carrier vehicle may travel.

In order to establish the initial conditions for the guidance system, geographic position may be continuously determined after the carrier vehicle leaves its operational base by use of the guidance system in an earth navigation mode. Operation in the earth navigation mode may be aided by the use of check points located along the selected route of travel so that occasional corrections of latitude and longitude may be made. In this mode of operation, the stabilized platform is erected to the geodetic vertical and the geodetic position is determined, with the required degree of accuracy for use in both earth and in-flight navigation, using presently available intertial guidance components and instruments. During ground navigation, azimuth information is derived by continuous gyrocompassing of the inertial measurement unit and the accuracy obtained is adequate for the earth navigation but is inadequate for in-flight navigation of the missile.

Because of mobility and short reaction time requirements, azimuth alignment at a random launch site cannot be established by the well known alignment technique using a theodolite and a reference or bench mark. It has been proposed to use gyrocompassing of the inertial platform but the azimuth alignment error inherent in this method precludes its use in the establishment of azimuth alignment for in-flight guidance. Even with the best available gyroscopes in quantity production, inertial platform gyrocompassing within a few arc seconds of true north cannot be obtained in operational use in a time compatible with the desired reaction time and a very substantial improvement would be needed in gyroscope performance to utilize gyrocompassing successfully. Pendulous type gyroscompasses have been investigated for azimuth alignment but even if accuracy of these instruments could be improved sufficiently, the set-up and settling time required is not compatible with the reaction time requirements for a mobile based missile. Furthermore, such technique presents a problem of transferring azimuth alignment data to the stabilized platform. Alignment at the launch site by celestial fixes has also been proposed but to maintain continuous azimuth alignment with the desired degree of accuracy would require continuous star tracking in azimuth and elevation and hence considerable weight and complexity in the alignment system. Furthermore, accuracy and reliability would be dependent upon atmospheric conditions.

This invention obviates the difficulties of the previously known techniques for azimuth alignment and achieves the desired accuracy with simple and reliable equipment and without any effect on reaction time. This is achieved by coarse azimuth alignment of the inertial platform prior to launch and then, after launch, scanning a single star in azimuth to correct the azimuth alignment. Thus in accordance with the invention, the inertial measurement unit defining a coordinate system is aligned with reference to the vertical direction at the launch point and is aligned in azimuth with insufficient accuracy to achieve cross-range guidance within a predetermined probable error. A star scanner is positioned on the inertial measurement unit so that its azimuth angle with reference to the coordinate system is equal to the azimuth of a selected star. After the missile is launched, it is steered with reference to the coordinate system until it is at an altitude such that the atmosphere has a negligible effect on the optical path between the star and the star scanner. Then the star scanner is displaced in azimuth through a scanning angle greater than the azimuth error produced by the pre-launch azimuth alignment so that the interception of the optical axis with the selected star provides a precise measurement of the azimuth alignment error. Then the azimuth alignment error information is supplied to the guidance computer. The computer then corrects its calculations based upon the alignment error information and the missile is steered with reference to a second coordinate system which is displaced from the first by the azimuth error angle so that the cross-range guidance is within the predetermined probable error.

A more complete understanding of this invention may be had from the detailed description which follows taken with the accompanying drawings in which.

Figure 4:
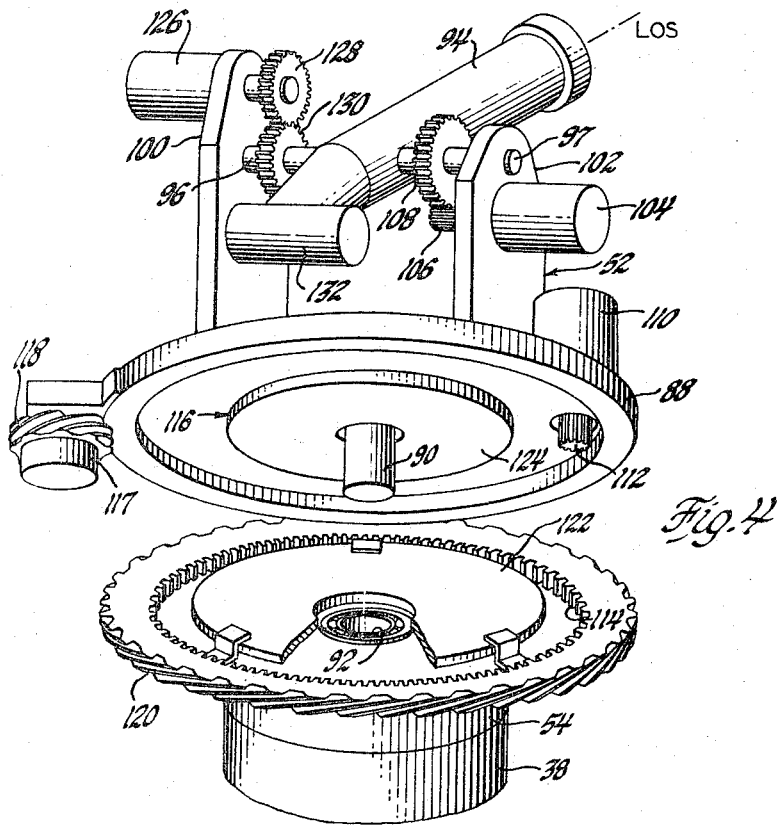
Figure 5:
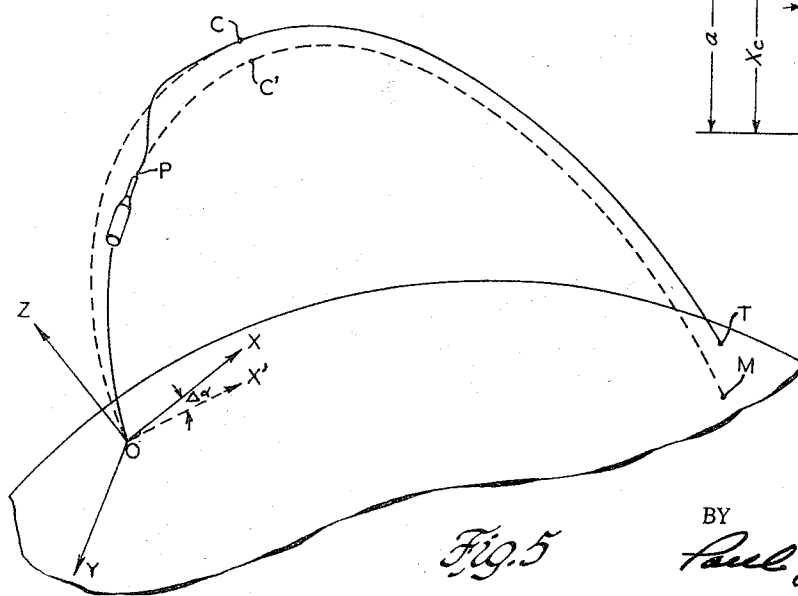
Figure 6:
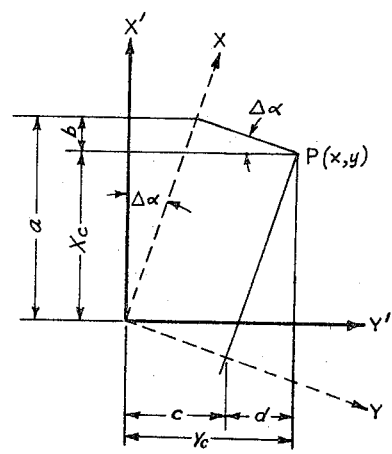

FIGURE 4 discloses the structure of the star scanner;

FIGURE 5 shows the orientation of the coordinate axes with reference to the launch point and target;

FIGURE 6 shows the relationship between the original coordinate axes and the corrected coordinate axes; and FIGURE 7 represents the computer for correction of the guidance equations.

Referring now to the drawings, there is shown an illustrative embodiment of the invention in an inertial guidance system for a ballistic missile with combined gyrocompassing and star scanning to determine precise azimuth alignment. The inventive azimuth alignment system will produce azimuth alignment correction with sufficient accuracy to achieve cross-range guidance within a predetermined probable error provided that the other initial conditions of geodetic position and vertical alignment are determined with sufficient accuracy to achieve down-range guidance within the probable error. The invention is not dependent upon any particular manner of achieving the desired accuracy of other initial conditions but the illustrative embodiment will be described in a system wherein the geodetic position and vertical alignment are determined with the required accuracy prior to launch.

Figure 1:
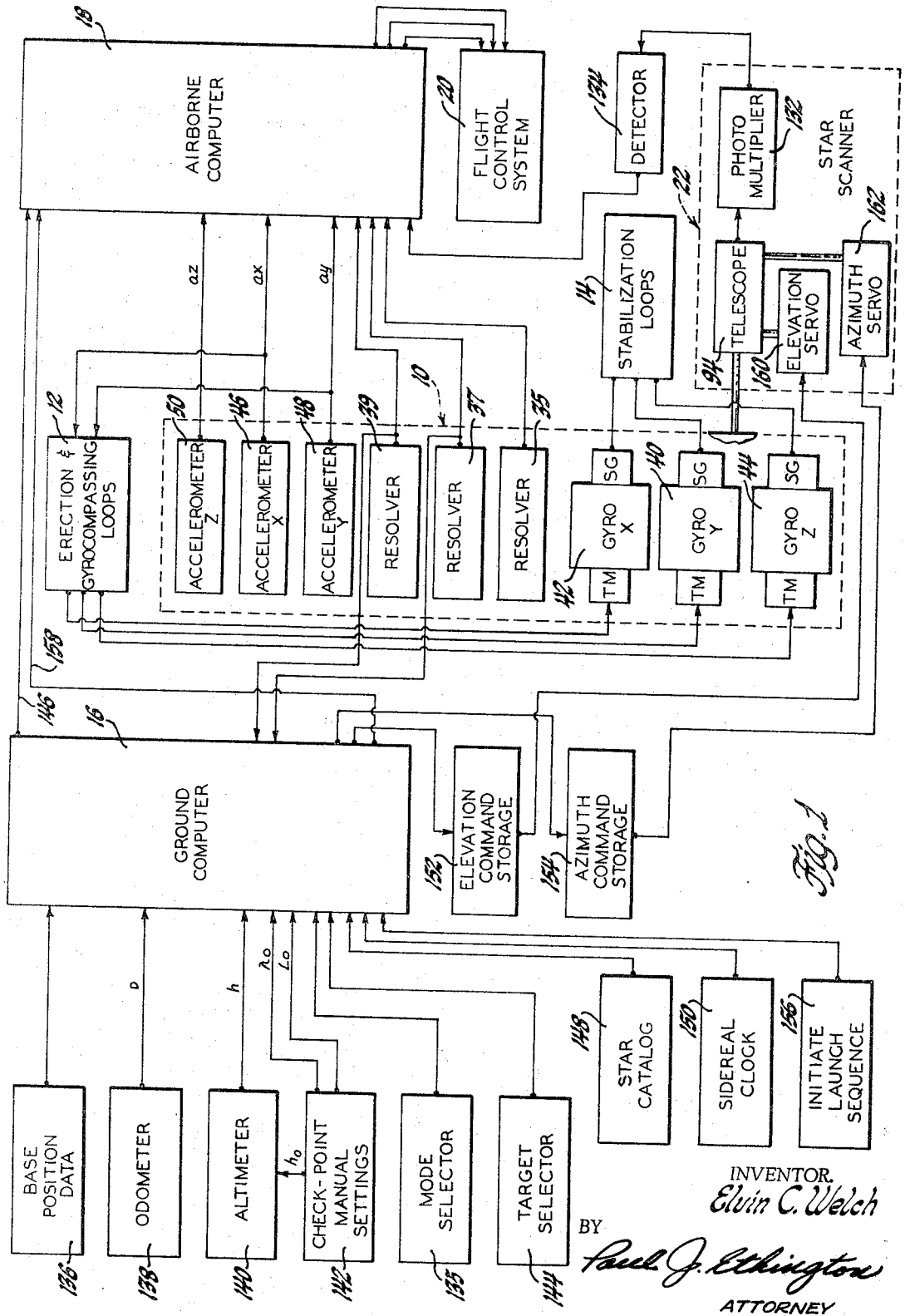
FIGURE 1 represents the guidance system for both earth mode and airborne navigation.

In general, and as illustrated in FIGURE 1, the system comprises an inertial measurement unit including a stabilized platform 10 with erection and gyrocompassing loops 12 for aligning the principal axes of the stabilized platform with the local vertical direction, true north and east direction. The stabilized platform is maintained continuously in this orientation by stabilization loops 14. The system further comprises a ground computer 16 which is utilized in the earth navigation mode only and which receives carrier vehicle displacement signals from external sources and receives gimbal angle signals from the inertial measurement unit and resolves the displacement signals into longitude and latitude components to continuously determine geodetic position. At the time of launch, the position information, along with azimuth information from the inertial measurement unit, is supplied to an airborne computer 18 which is carried in the missile and which receives acceleration signals from the inertial measurement unit to develop control signals for a flight control system 20. Prior to launch, the ground computer also supplies pointing angle information for a selected star, as developed from the position information and star data, to a star scanner 22 which is mounted on the stabilized platform and is positioned in azimuth and elevation with reference to the coordinate axes of the stabilized platform. At the time of launch, the initial conditions are supplied from the ground computer to the airborne computer which then supplies signals to the flight control system to steer the missile so as to intercept the selected target. After the missile has reached an altitude such that the atmospheric effects are negligible, the star scanner commences an azimuth scan cycle and upon detection of the selected star supplies an azimuth error signal to the airborne computer. The airborne computer modifies the guidance equations in accordance with the azimuth error signal and then supplies control signals to the flight control system so that the missile is steered with reference to corrected reference coordinate axes.

*The inertial measurement unit*

Figure 2:
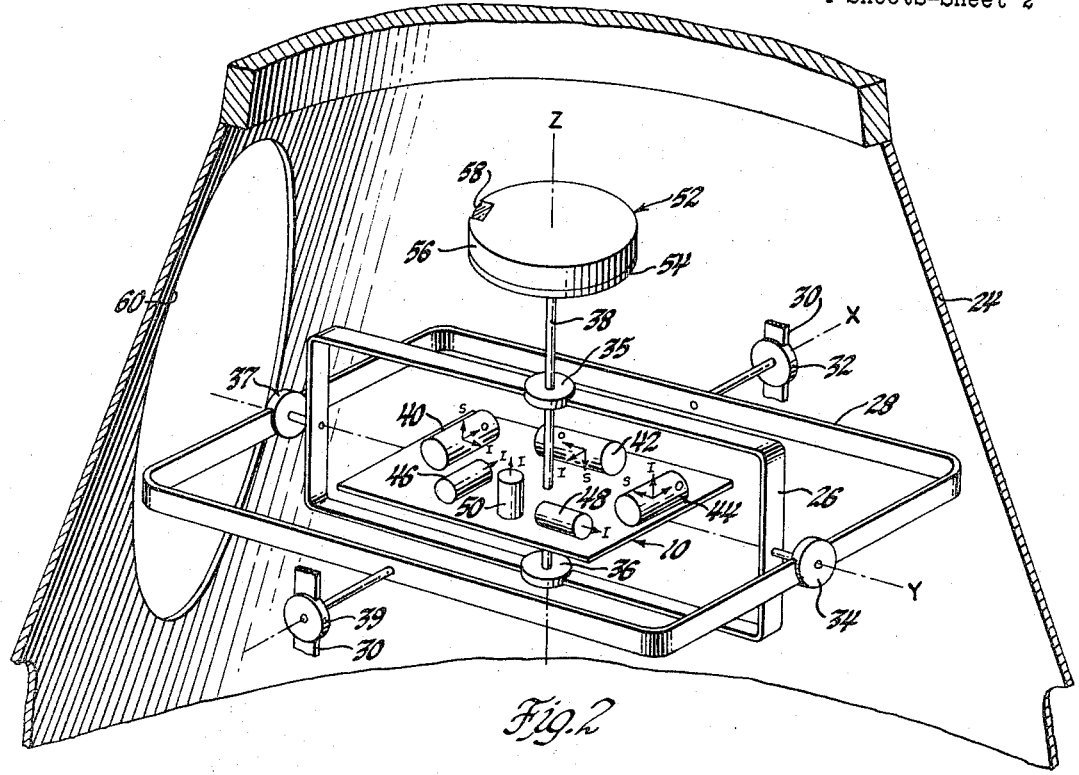
FIGURE 2 illustrates the inertial measurement unit.

Considering the system in greater detail, the inertial measurement unit, as shown in FIGURE 2, is mounted within the body of a missile 24 and comprises the inner gimbal or stabilized platform 10 supported for rotation about the azimuth axis of the measurement unit by a middle or roll gimbal 26. The roll gimbal is supported for rotation about the roll axis by an outer or pitch gimbal 28 which in turn is supported for rotation about the pitch axis in a support frame 30 fixed to the airframe of the missile. The azimuth, pitch and roll axes of the measurement unit are orthogonally disposed and with the missile in the erect position at launch, the measurement unit axes correspond generally with the yaw, pitch and roll axes of the missile. To permit erection and attitude stabilization of the platform 10, independently of the motions of the missile, a pitch torque motor 32 is interposed between the frame 30 and one trunnion of the outer gimbal 28 and similarly a roll torque motor 34 is interposed between the outer and middle gimbals and an azimuth torque motor 36 is connected between the middle gimbal and the azimuth shaft 38 of the platform 10. To develop gimbal angle information, an azimuth resolver 35 is connected between the shaft 38 and middle gimbal, a roll resolver 37 is connected between the middle and outer gimbals, and similarly a pitch resolver 39 is connected between the outer gimbal and frame. Inertial sensing instruments are mounted upon the stabilized platform and define a set of orthogonal coordinate reference axes X, Y and Z as indicated in FIGURE 2. For the purpose of sensing disturbances in the attitude of the platform, the platform carries three single degree of freedom integrating type gyroscopes 40, 42 and 44, each having input, output and spin axes designated as I, O and S, respectively. Of these, the roll gyroscope 40 has its input axis aligned with the Y axis, the pitch gyroscope 42 has its input axis aligned with the X axis, and the azimuth gyroscope 44 has its input axis aligned with the Z axis. For the purpose of sensing accelerations along the reference coordinate axes, the platform carries three accelerometers 46, 48 and 50 having their input axes aligned parallel to the X, Y and Z axes respectively. Mounted upon the azimuth shaft 38 for movement therewith is the star scanner 52 which includes a base 54 rigidly mounted on the shaft 38 and includes a rotatable cover 56 with an optical aperture 58. When the missile pitches over in flight the optical aperture of the star scanner is disposed adjacent an optical window 60 in the outer surface of the missile case so that an optical path extends rearwardly of the missile. The star scanner will be described in greater detail subsequently.

*Alignment and stabilization systems*

Figure 3:
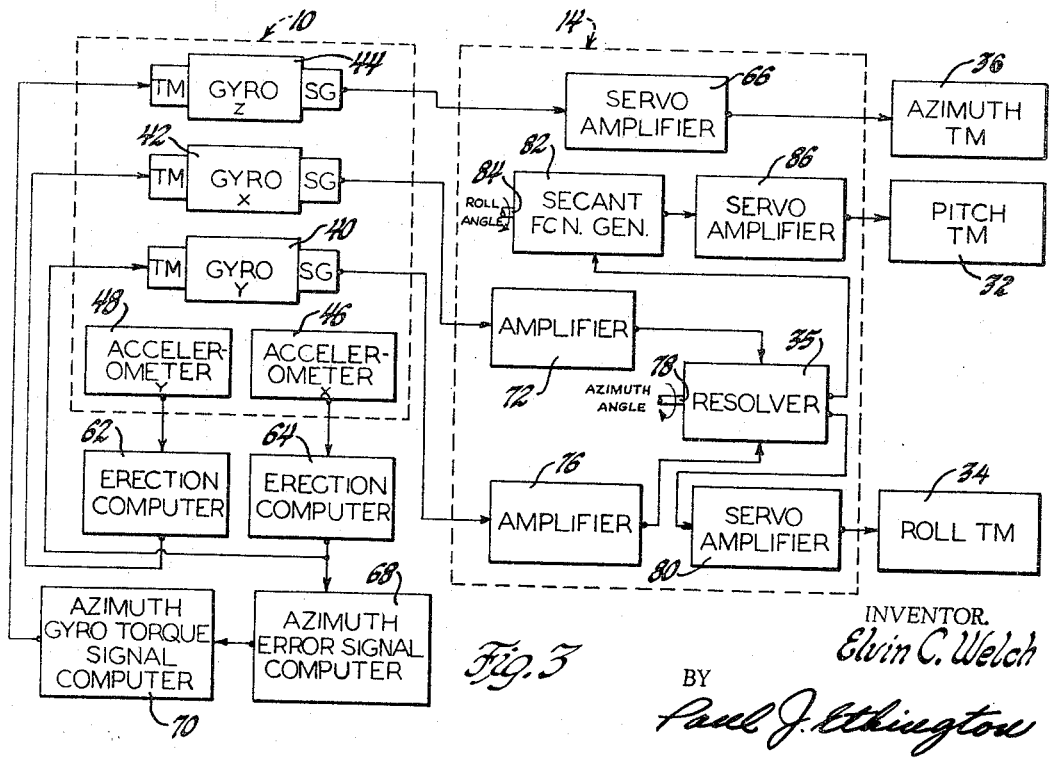
FIGURE 3 represents the erection and gyrocompassing loops.

Although the alignment and stabilization systems for the stabilized platform 10 are, per se, of known configurations, a brief description will be given with reference to FIGURE 3. The erection and alignment system of the illustrative embodiment are disclosed in U.S. Patent 2,955,474. A similar gyrocompassing technique is described in the Journal of the Franklin Institute, November 1958, pp. 373–402, in an article entitled, "Inertial Navigation," by C. F. O'Donnell. In the illustrative embodiment of the invention, the coordinate reference axes are to be aligned so that the Z axis is directed in the local vertical direction, the X axis extends in the true north direction and the Y axis extends in the east direction. Accordingly, the X and Y axes are to be disposed in the horizontal plane and for the purpose of erecting the platform horizontally, the Y axis accelerometer 48 which develops an output signal corresponding to the tilt of the platform about the X axis is connected to an erection computer 62. The erection computer develops a torque signal corresponding to the summation of the acceleration signal and the time integral of the acceleration signal. This torque signal is applied to the torque motor of the pitch gyroscope 42 causing the signal generator thereof to develop an output signal which is applied to the stabilization computer 14. Similarly, the X axis accelerometer 46 develops an acceleration signal corresponding to tilt of the platform about the Y axis and this acceleration signal is applied to the erection computer 64 which develops a torque signal corresponding to the sum of the acceleration signal and its time intergral. The torque signal from the erection computer 64 is applied to the torque motor of the roll gyroscope 40 causing its signal generator to develop an output voltage which is applied to the stabilization computer 14. By gyrocompassing, a coarse azimuth alignment of the platform is achieved and for this purpose, the torque signal output from the erection computer 64 is applied to an azimuth error signal computer 68 which develops an output error signal corresponding to the summation of the torque signal and the drift coefficients of the roll gyroscope. This error signal is applied to the input of an azimuth gyroscope torque signal computer 70 which develops an output corresponding to the summation of the azimuth error signal and its time integral. The output of the azimuth gyro torque signal computer is applied to the torque motor of the azimuth gyro 44 causing its signal generator to develop an output signal which is applied to the stabilization computer 14.

The stabilization loops 14 are also of known configuration and, of course, function to erect and maintain the stabilized platform in an attitude in accordance with the output signals of the stabilization gyroscopes. The stabilization loops include a servo amplifier 66 having its input connected with the signal generator of the azimuth gyroscope 44 and its output connected with the azimuth torque motor 36. Since the X and Y axis gyroscope error signals must be resolved about the azimuth gimbal angle, the signal generator of the gyroscope 42 is connected through an amplifier 72 to one input of a resolver 35 and the signal generator of the gyroscope 40 is connected through an amplifier 76 to the other input of the resolver. As indicated by the connection 78, the azimuth angle displacement of the platform is supplied to the resolver 35. One output of the resolver is applied through a servo amplifier 80 to the roll torque motor 34. The other output of the resolver must be modified by the secant function of the roll gimbal angle and, accordingly, is applied to a secant function generator 82 which receives roll angle information, as indicated by the mechanical connection 84 with the stabilized platform. The output of the secant function generator is applied to the input of a servo amplifier 86 which controls the energization of the pitch torque motor 32.

During erection and alignment, the X and Y axes gyroscopes sense a component of earth rotation rate depending upon the orientation of their input axes with reference to the earth's axis. Consequently, these gyroscopes develop output error signals corresponding to the components of earth rate and the pitch and roll torque motors are energized in a sense tending to position the platform so that the torque signals developed by the erection computers from the respective accelerometer signals are changed to a value which will counteract the earth rate components sensed by the gyroscopes and reduce the output error signal of the gyroscopes to null. Therefore, the torque signals from the output of the erection computers 62 and 64 correspond to the earth rate components sensed by the gyroscopes. In order to align the platform in azimuth the torque signal developed by the erection computer 64 is applied through the azimuth error signal computer and the gyro torque signal computer 70 to the torque motor of the azimuth gyroscope 44. This causes the azimuth gyroscope to develop an error signal which is applied through servo amplifier 66 to the azimuth torque motor 36 to cause rotation of the platform until the error signal of the azimuth gyroscope is reduced to null. This condition will be achieved when the platform is aligned in the horizontal plane with the input axis of the gyroscope 44 pointed in the east direction so that the component of earth rate sensed thereby is reduced to zero. Thus, as the platform is rotated in azimuth by the torque motor 36 to null the azimuth gyroscope signal, the torque signal developed by the erection computer 64 will decrease and cause the roll torque motor 34 to level the platform about the roll axis and the torque signal developed by the erection computer 62 will decrease and cause the pitch torque motor 32 to level the platform about the pitch axis. Thus the platform is erected with the Z axis extending in the vertical direction, the X axis extending true north and the Y axis extending east. The platform is maintained in this orientation, despite external disturbances, by the stabilization loops 14.

*The star scanner*

The star scanner is a precision optical instrument adapted to measure the azimuth angle between a selected star and a predetermined angular position of the star scanner with reference to the X-coordinate axis. This is accomplished during the missile flight by single axis scanning without any requirement for tracking or locking on the selected star. The star scanner 52 is illustrated in FIGURE 4 with the cover 56 (see FIGURE 2) removed, and is mounted by the base 54 upon the azimuth shaft 38 of the inertial measurement unit for rotation therewith. A support plate 88 is mounted upon the base for rotation about the azimuth axis by a stub shaft 90 which engages a bearing 92 in the base. A telescope 94 is mounted upon the support plate for rotation about an elevation axis by trunnions 96 and 97 which are journaled in a pair of support brackets 100 and 102, respectively. In order to position the line of sight LOS of the telescope at a desired elevation angle, an elevation drive motor 104 is mounted on the bracket 102 and has a drive pinion 106 meshing with a gear 108 on the trunnion 97. To position the telescope line of sight at a desired azimuth angle, an azimuth drive motor 110 is mounted on the plate 88 and has a drive pinion 112 extending through the plate into mesh with an internal gear 114 mounted on the base.

To provide for measurement of the telescope azimuth angle, an "Inductosyn" angular displacement pick-off 116 is used in conjunction with a coarse synchro 117. The coarse synchro is mounted upon the plate 88 for movement therewith and carries on its shaft a helical gear 118 meshing with a helical gear 120 on the periphery of the internal gear 114. The coarse synchro is used to position the telescope within one-half degree of the desired angle before the Inductosyn pick-off is used for angular measurement.

The Inductosyn pick-off 116 is available from Farrand Controls, Inc., New York, and functions as a multipole resolver to achieve extreme accuracy in angular measurement. The pick-off includes a stator 122 mounted on the base and a rotor 124 mounted on the lower surface of the support plate for rotation therewith. The stator has a printed circuit defining 360 poles and the rotor has a 360 turn continuous winding so that one full sine wave and one full cosine wave are produced for every two degrees of rotation. By nulling this signal against a reference signal, position accuracy of a few arc seconds can be achieved. The elevation angle of the telescope is measured by an elevation synchro 126. The synchro 126 is mounted upon the bracket 100 and has on its shaft a gear 128 which meshes with a gear 130 on the trunnion 96.

The telescope is a refractor with a clear aperture of ¾ inch and effective focal length of 12½ inches. Although a straight telescope is illustrated for simplicity, this focal length may be achieved within small space by an optical configuration of a simple telephoto lens using one 90 degree elbow. The telescope is suitably designed for detecting a fourth magnitude star and may have a scanning slit about 20 arc-minutes long in the vertical direction and about 16 arc-seconds wide. This slit configuration will allow a large area field, 20 min. high, to be scanned in one sweep of the slit from left to right. However, the replacement of the elevation servo described, with one identical to the azimuth servo described, will allow an elevation position accuracy of a few arc seconds to be achieved. With this increased accuracy the slit height may be reduced to approximately 16 sec. in length. The reduced slit area then allows the scanning operation to be performed in the presence of increased background illumination from a daylight sky.

A photomultiplier tube 132 is mounted at the output end of the telescope and the radiation passing through the scanning slit impinges on the photo-cathode of the tube. The output signal from the photomultiplier is applied to an amplifier (not shown) and thence to the detector circuit 134 (FIG. 1).

*Earth navigation mode*

Upon departure of the carrier vehicle from its operational base, the system is operated in an earth navigation mode which will be described briefly with reference to FIGURE 1. The geodetic position coordinates of the base are the initial conditions for earth navigation computation which is provided by the ground computer 16. The ground computer will not be described in detail since it may be of conventional design; instead, a brief functional description will be given as an aid to understanding the overall system. The computer functions in either a ground navigation mode or a prepare-to-launch mode as selected by a manually controlled mode selector 135. In the earth navigation mode, which is initiated upon departure from the base, the inertial measurement unit 10 is erected and aligned with the Z-axis extending in the vertical direction, the X-axis extending true north and the Y-axis extending east. The coordinates of the base position are supplied to the ground computer from a position data source 136. Position information is continuously developed as the carrrier vehicle moves along the roadway by means of an odometer 138 which measures the distance traveled along the roadway and supplies a distance signal D to the ground computer. The computer is also supplied with gimbal angle signals from the resolvers 39 and 37 in the inertial measurement unit and resolves the distance signal into X and Y coordinate components. The distance signal components are added to the X and Y coordinates of the operational base to derive present position information. An altimeter 140 supplies an altitude signal $h$ to the computer so that the Z coordinate of position is known. In order to provide occasional corrections in the computed position information, check points may be established along the route of travel. The check points furnish latitude, longitude and altitude data which may be supplied to the computer by a manual setting 142.

*Prepare-to-launch mode*

When an alert command is received the carrier vehicle is stopped and the mode selector 135 is switched to the prepare-to-launch mode. In this mode the designated target is selected by manual operation of the target selector 144 which causes the ground computer to calculate guidance parameters based upon the selected target position data which is stored in the computer and the launch site position data which was developed in the computer during the earth navigation mode. The guidance parameters are transferred from the ground computer to the airborne computer in the missile over a data link 146.

The ground computer also selects a star from the star catalog 148 in accordance with the local sidereal time supplied by a clock 150. The exact pointing angles for the selected star are calculated for the latch site latitude and longitude based upon Greenwich sidereal time and the right ascension and declination of the selected star. The elevation pointing angle is supplied to an elevation command storage 152 and the azimuth pointing angle is supplied to an azimuth command storage 154.

The ground computer then automatically advances to a launch-ready mode in which the star pointing angles are continuously updated and the platform of the inertial measurement unit is maintained level with respect to the local vertical and azimuth orientation is provided by gyrocompassing, as in the earth navigation mode.

*Inertial mode*

In the prepare-to-launch mode, launch sequencing may be initiated by a command signal to the ground computer from a launch sequence control 156. Upon a signal from the ground computer over a data link 158, the airborne computer flight computations are initiated. When flight computations are started in the airborne computer, the torquing signals are removed from the stabilization gyroscopes so that the platform will be fixed in inertial space by the stabilization loops 14. Thus the orientation in inertial space will correspond to the orientation at the launch site; i.e., the X, Y and Z axes will be parallel to true north, east and vertical directions at the launch site. At the initiation of this inertial mode, the selected star pointing angles are held fixed in the elevation command storage 152 and the azimuth command storage 154. The elevation command signal is applied to an elevation servo 160 which includes the elevation drive motor 104 and elevation synchro 126 (FIGURE 4) in a follow-up loop. Similarly, the azimuth command signal is applied to an azimuth servo 162 which includes the azimuth drive motor 110 and azimuth coarse synchro 117 together with the Inductosyn pick-off 116 in a follow-up loop. A bias level is provided in the azimuth servo loop and corresponds to ½ degree displacement to the left, for a 1 degree wide search field, so that the telescope line of sight is pointed at the commanded elevation angle but ½ degree to the left of the commanded azimuth angle. Since the launch site position information is of the desired degree of accuracy, the telescope line of sight would be ½ degree to the left of the selected star if the azimuth alignment were perfect. However, the azimuth alignment by gyrocompassing prior to launch is in error by an unknown azimuth error so a correction during missile flight is required.

*Missile guidance*

The inertial guidance of the missile after launch will be described with reference to FIGURES 5, 6 and 7. For the purpose of deriving velocity and position information, the inertial measurement unit 10 continuously supplies X, Y and Z axis acceleration signals $a_x$, $a_y$ and $a_z$ to subtractor units 164, 166 and 168, respectively. The outputs of the subtractor units are supplied to first integrators 170, 172 and 174 and the outputs thereof are supplied to second integrators 176, 178 and 180, respectively. In order to eliminate the gravity components from the acceleration signals, the outputs of the second integrators are supplied to a gravity computer 182 and the outputs thereof are supplied to the respective subtractor units and subtracted from the corresponding acceleration signals. Thus the integrators 170, 172 and 174 develop output signals $V_x$, $V_y$ and $V_z$, respectively, corresponding to the measured missile velocity components along the X, Y and Z axes. The integrators 176, 178 and 180 develop output signals $x$, $y$ and $z$ corresponding to the measured missile dispalcement components along the X, Y and Z axes.

With reference to FIGURE 5, it is noted that the values of the velocity components $V_x$, $V_y$ and $V_z$ and the values of the displacement components $x$, $y$ and $z$ are measured throughout the powered flight of the missile with reference to the X, Y and Z coordinate reference system even though it is aligned with an unknown azimuth error. This azimuth error $\Delta\alpha$ is the angular displacement between the direction of the X-axis and true north at the launch point O. It is noted that if the azimuth error angle $\Delta\alpha$ at launch were zero, the missile would follow a powered flight trajectory indicated by the dashed line O—C and continue on a ballistic trajectory C—T to hit the target T with a probable error less than a predetermined value. However, when the unknown azimuth error is not zero and if no correction is made, the missile would follow a powered flight trajectory O—P—C' and continue on a ballistic trajectory C'—M to impact the point M. The down-range miss distance would be within the predetermined probable error because the position of the launch point was known with the required degree of accuracy. The cross-range miss distance between the target T and the point M would exceed the predetermined probable error due to azimuth error in the initial alignment.

In accordance with this invention the value of the azimuth error $\Delta\alpha$ is determined while the missile is in powered flight at a point P beyond the sensible atmosphere of the earth and a correction is made in the missile guidance before thrust cut-off to account for the azimuth error. This is accomplished by initiating the scanning operation of the star scanner 22 when the desired altitude is reached by applying the Z-axis displacement signal $z$ to a scan controller 184. When the signal $z$ corresponds to the desired altitude, suitably 150,000 feet, the scan controller energizes the azimuth servo 162 of the star scanner causing the telescope 94 to be displaced in azimuth from left to right. The azimuth pick-off 116 generates a signal, as a string of pulses corresponding to the telescope displacement. When the star image impinges upon the photomultiplier 132 the detector 134 generates a pulse having leading and trailing edges corresponding to the leading and trailing edges of the star. The detector and pick-off pulses are applied to a register and average computer 186 which computes the average value of the scan angle at the leading and trailing edges of the star pulse and subtracts the initial azimuth servo bias of ½ degree. The computer develops an output signal $\Delta\alpha$ corresponding to the angle between the center of the star image and the initial azimuth pointing angle of the telescope line of sight. Thus the signal $\Delta\alpha$ corresponds to the value of platform azimuth alignment error that existed at the time of launch.

In order to correct the missile guidance according to the azimuth alignment error, the measured velocity and displacement components are transformed to reference coordinate axes X', Y' and Z which are displaced from the X, Y and Z coordinates by the azimuth error angle $\Delta\alpha$. For this purpose the velocity signals $V_x$ and $V_y$ and the displacement signals $x$ and $y$ along with the azimuth error signal $\Delta\alpha$ are applied to a coordinate transformation computer 188. Although the coordinate transformation, per se, is well known, it will be described briefly with reference to FIGURE 6. In this figure, the X'Y'Z axes are rotated counterclockwise about the Z-axis through the azimuth error angle $\Delta\alpha$ from the XYZ axes. The missile is at point P with coordinates $x$ and $y$, with reference to XYZ axes, when the azimuth error angle is determined and it is desired to determine the coordinates $x_c$ and $y_c$ of the point P with reference to the X'Y'Z axes. By inspection of FIGURE 6, it is seen that $$x_c = a - b \tag{1}$$

where $$a = x \cos \Delta\alpha \tag{2}$$

and $$b = y \sin \Delta\alpha \tag{3}$$

Combining Equations 2 and 3 in Equation 1 yields $$x_c = x \cos \Delta\alpha - y \sin \Delta\alpha \tag{4}$$

Similarly, it is seen that $$y_c = c + d \tag{5}$$

where $$c = y \cos \Delta\alpha \tag{6}$$

and $$d = x \sin \Delta\alpha \tag{7}$$

Substituting the values of $c$ and $d$ from Equations 6 and 7 into Equation 5 yields $$y_c = y \cos \Delta\alpha + x \sin \Delta\alpha \tag{8}$$

By the same geometry, the velocity components $V_x$ and $V_y$ at the point P, with reference to the XYZ axes, may be transformed to corrected velocity components $V_{xc}$ and $V_{yc}$ with reference to the X'Y'Z axes by the following expressions:

$$V_{xc} = V_x \cos \Delta\alpha - V_y \sin \Delta\alpha \tag{9}$$

$$V_{cy} = V_x \sin \Delta\alpha + V_y \cos \Delta\alpha \tag{10}$$

The computer 188 continuously solves Equations 4, 8, 9 and 10 and develops position signals $x_c$ and $y_c$ corresponding to the position coordinates of the missile in the X'Y'Z coordinate system and develops velocity signals $V_{xc}$ and $V_{yc}$ corresponding to the missile velocity components with respect to the X'Y'Z coordinates system. The position signals $x_c$ and $y_c$ from the computer 188 and the position signal $z$ from the integrator 180 are applied to a trajectory computer 190. The trajectory computer combines the position signals in accordance with the predetermined trajectory or guidance equations and develops signals $V_{xr}$, $V_{yr}$ and $V_{zr}$ corresponding to the velocity required at the given missile position in order to achieve the position and velocity at the thrust cut-off point which will produce a ballistic trajectory intercepting the target. The particular guidance equations depend, of course, upon the choice of guidance scheme. In the illustrative embodiment of the invention, the Q-guidance scheme is employed and, as indicated in the block diagram of the trajectory computer, the velocity required components $V_{xr}$, $V_{yr}$ and $V_{zr}$ are all functions of missile position coordinates $x$, $y$ and $z$. The Q-guidance system is described in chapter 1 of An Introduction to Ballistic Missiles, volume 5 (revised Mar. 1, 1960), published by the Air Force Ballistic Missile Division, Space Technology Laboratories of Los Angeles, Calif. Of course, the invention may be practiced in systems employing other guidance schemes such as an explicit guidance and Delta guidance, as described in chapters 3 and 4, respectively, of An Introduction to Ballistic Missiles, volume 5.

In order to develop control signals for the flight control system 20, the velocity required signals $V_{xr}$, $V_{yr}$ and $V_{zr}$ are applied to a velocity-to-be-gained computer 192. The velocity signals $V_z$ from the integrator 174 and $V_{xc}$ and $V_{yc}$ from the computer 188 are also supplied to the computer 192 which subtracts the respective velocity components and develops output signals $V_{gx}$, $V_{gy}$ and $V_{gz}$ corresponding to the velocity to be gained along the respective X'Y'Z axes. The velocity-to-be-gained signal $V_{gy}$ is applied to the yaw steering control, the signal $V_{gz}$ is applied to pitch steering control and the signal $V_{gx}$ is applied to the thrust cut-off control in the flight control system.

It is to be noted that the azimuth alignment error $\Delta\alpha$ is not determined until the signal $z$ reaches a predetermined value and hence the coordinate transformation computer functions as though $\Delta\alpha$ were zero until that time, causing the signals $x_c$ and $y_c$ to be equal to the signals $x$ and $y$, respectively, and the signals $V_{xc}$ and $V_{yc}$ to be equal to the signals $V_x$ and $V_y$, respectively. The powered flight trajectory thus extends from launch point O to the point P during the interval when the guidance is based upon the XYZ coordinate system in which the azimuth alignment error exists. At the point P the error $\Delta\alpha$ is determined and the signals $x_c$, $y_c$, $V_{xc}$ and $Y_{yc}$ are corrected in accordance with the value of $\Delta\alpha$. The guidance is then based on the X'Y'Z coordinate system causing the trajectory to be corrected along the path P—C which coincides with the powered flight trajectory O—C before the thrust cut-off point C is reached. The velocity-to-be-gained signal $V_{gx}$, applied to the thrust cut-off control, terminates missile thrust when the signals $V_{gz}$, $V_{gy}$ and $V_{gx}$ go to zero simultaneously at point C. Thus the missile continues on the ballistic trajectory C—T and hits the target T with a cross-range miss distance and down-range miss distance within the predetermined probable error.

*Summary*

In accordance with this invention, an inertial guidance system, especially adapted for mobile based missiles, is provided which permits missile launching from a random, unsurveyed site with minimum reaction time. Geodetic position data is developed by ground navigation during missile transport and alignment of the inertial measurement unit is accomplished by erection to the local vertical and gyrocompassing the stable platform. In the illustrative embodiment described, position information and vertical alignment are determined with the required degree of accuracy prior to launch but the pre-launch azimuth alignment, by gyrocompassing or other techniques which would permit short reaction time, is not sufficiently accurate for airborne guidance. Therefore, the invention provides for correction of the azimuth alignment after the missile is launched. Until the correction is made, guidance is based upon the coordinate reference axes established by the inertial measurement unit with an unknown value of azimuth error. Just prior to launch, a star is selected in accordance with the target selection and a star scanner telescope is pointed, with reference to the coordinate system of the measurement unit, in elevation and azimuth angles corresponding to the right ascension and declination of the selected star. Thus, if the azimuth alignment of the measurement unit were correct, the line of sight of the telescope would intercept the star. After the missile has passed through the earth's sensible atmosphere, the telescope is caused to scan in azimuth from the initial azimuth pointing angle to the point of interception of the star. This scan angle is equal to the azimuth alignment error of the coordinate reference axes established by the inertial measurement unit. To correct the guidance of the missile, a new set of coordinate reference axes is established by rotation of the reference axes established by the measurement unit through an azimuth angle equal to the azimuth alignment error. This is suitably accomplished by coordinate transformation of the velocity and displacement signals derived from the inertial measurement unit. Accordingly, the missile is steered with reference to the new coordinate reference axes throughout the remainder of the powered flight causing the missile to follow a ballistic trajectory which hits the target within a predetermined probable error.

Although the invention has been described with respect to a particular embodiment, such description is not to be construed in a limiting sense. Numerous modifications and variations within the spirit and scope of the invention will now occur to those skilled in the art. For a definition of the invention, reference is made to the appended claims.

I claim:

1. The method of providing cross-range inertial guidance for a missile from a launch point to a selected target with a probable error less than a predetermined value, said missile including an inertial measurement unit including accelerometers which define a first coordinate system and including a star scanner with an optical axis which may be displaced in azimuth with reference to the measurement unit, said method including the steps of aligning the measurement unit with the vertical direction at the launch point, aligning the measurement unit in azimuth with an accuracy that may be insufficient to permit cross-range guidance with a probable error less than said predetermined value, positioning the star scanner so that its optical axis has an azimuth angle, with reference to said first coordinate system, which is equal to the azimuth of a selected star, launching the missile and steering it in accordance with signal quantities derived from the accelerometers with reference to the first coordinate system in a desired trajectory until the earth's atmosphere has a negligible effect on the optical path between the selected star and the star scanner, displacing the star scanner in azimuth through a scanning angle sufficient to cause its optical axis to be aligned with the selected star, transforming the coordinates of the signal quantities derived from the accelerometers to a second coordinate system which is displaced in azimuth from the first coordinate system by the displacement required to cause the optical axis of the star scanner to be aligned in azimuth with the selected star, and steering the missile in accordance with the transformed coordinates of the signal quantities whereby the azimuth alignment error will be corrected to permit cross-range guidance with a probable error less than the predetermined value.

2. The method of correcting an azimuth alignment error in the inertial guidance system of a missile, said guidance system including an inertial measurement unit with a stable platform supporting accelerometers, stabilization gyroscopes and a telescope, said platform defining a first coordinate system, said method including the steps of aligning the first coordinate system with the vertical direction at a known launch point with sufficient accuracy to permit down-range guidance with a probable error less than a predetermined value, aligning the first coordinate system in azimuth by gyrocompassing the platform so that one of the stabilization gyroscopes is non-responsive to earth rate whereby the azimuth alignment accuracy may be insufficient to permit cross-range guidance within the predetermined probable error, pointing the telescope with reference to first coordinate axes at an azimuth and an elevation angle of a selected star from the launch point as determined from star tables and sidereal time, launching the missile and maintaining the platform in a fixed attitude in inertial space, steering the missile in accordance with signal quantities derived from the accelerometers with reference to the first coordinate system until after the missile has passed through the earth's sensible atmosphere, displacing the telescope in azimuth through a scanning angle sufficient to cause its optical axis to be aligned with the selected star, correcting the azimuth alignment error by transforming the coordinates of the signal quantities derived from the accelerometers to a second coordinate system which is displaced in azimuth from the first coordinate system by the displacement required to cause the optical axis of the telescope to be aligned in azimuth within the selected star, and steering the missile in accordance with the transformed signal quantities whereby cross-range guidance will be permitted with a probable error less than the predetermined value.

References Cited by the Examiner

UNITED STATES PATENTS 2,949,030 8/1960 Horsfall et al. _____ 244—14.4
3,037,289 6/1962 Garbarini et al. _____ 250—203
3,048,352 8/1962 Hansen _____ 244—14

BENJAMIN A. BORCHELT, *Primary Examiner.*

SAMUEL FEINBERG, *Examiner.*

T. A. ROBINSON, M. F. HUBLER,
*Assistant Examiners.*